(12) United States Patent
Heinzen

(10) Patent No.: US 8,846,124 B2
(45) Date of Patent: Sep. 30, 2014

(54) APPARATUS AND METHOD FOR FORMING A PRESSED, BAKED FOOD PRODUCT

(75) Inventor: Thomas E. Heinzen, Burnsville, MN (US)

(73) Assignee: General Mills, Inc., Minneapolis, MN (US)

( * ) Notice: Subject to any disclaimer, the term of this patent is extended or adjusted under 35 U.S.C. 154(b) by 2167 days.

(21) Appl. No.: 11/570,619

(22) PCT Filed: Jun. 22, 2005

(86) PCT No.: PCT/US2005/022129
§ 371 (c)(1),
(2), (4) Date: Oct. 27, 2008

(87) PCT Pub. No.: WO2007/055677
PCT Pub. Date: May 18, 2007

(65) Prior Publication Data
US 2009/0074921 A1    Mar. 19, 2009

Related U.S. Application Data

(60) Provisional application No. 60/584,907, filed on Jul. 1, 2004.

(51) Int. Cl.
*A23P 1/10* (2006.01)
*A21B 1/44* (2006.01)

(52) U.S. Cl.
USPC ........... 426/502; 426/505; 426/517; 426/523; 426/808; 99/349; 99/353; 99/373; 99/377; 99/379; 99/386; 99/391; 99/393; 99/427; 99/443 C; 425/89; 425/371

(58) Field of Classification Search
CPC ............... A21B 1/44–1/48; A23P 1/10–1/105; A47J 43/20; A21D 13/0074
USPC ......... 426/523, 502, 505, 512, 517, 520, 808; 99/373, 377, 379, 386, 389, 391, 393, 99/353, 349, 427, 432, 443 C; 425/89, 371
See application file for complete search history.

(56) References Cited

U.S. PATENT DOCUMENTS 2,070,850 A    2/1937   Trabold
3,223,053 A *  12/1965  Jimenez et al. ................. 99/353
(Continued)

FOREIGN PATENT DOCUMENTS

WO   WO 03/079797   10/2003
WO   WO 03/092407   11/2003

OTHER PUBLICATIONS

Pear, Walnut and Gorgonzola Pizzas (Feb. 1, 2002) available at http://www.familyoven.com/recipe/pear-walnut-and-gorgonzola-pizzas/307719.*

(Continued)

*Primary Examiner* — Drew Becker
(74) *Attorney, Agent, or Firm* — Annette M. Frawley; Timothy A. Czaja

(57) ABSTRACT

A method for forming a pressed, baked food product including providing a dough intermediate puck. The dough intermediate puck is processed through a first, compression station that applies a compression force and heat to the dough intermediate puck, resulting in a pressed puck. The pressed puck is processed through a second, dwell and heating station that contacts opposing major surfaces of the pressed puck in a manner allowing the pressed puck to naturally rise and applies heat to the puck, resulting in a pressed, at least partially-baked, food product. The above steps are characterized by continuous movement of the puck from an upstream end of the first station to a downstream end of the second station. In one embodiment, residual heat from the first station is applied in the second station.

23 Claims, 8 Drawing Sheets

(56) References Cited

U.S. PATENT DOCUMENTS

| | | | |
|---|---|---|---|
| 3,372,655 A | | 3/1968 | Williams |
| 3,572,258 A | | 3/1971 | Tangel |
| 3,646,880 A | | 3/1972 | Norris |
| 3,937,852 A | | 2/1976 | Wolf |
| 4,197,792 A | * | 4/1980 | Mendoza ......................... 99/349 |
| 4,623,550 A | * | 11/1986 | Willard .......................... 426/559 |
| 4,735,811 A | * | 4/1988 | Skarra et al. ................... 426/549 |
| 5,044,264 A | | 9/1991 | Forney |
| 6,112,647 A | | 9/2000 | Brunner et al. |
| 6,120,829 A | | 9/2000 | Schultz |
| 6,205,914 B1 | | 3/2001 | McCarney |
| 6,244,167 B1 | | 6/2001 | McCarney |
| 2003/0232103 A1 | * | 12/2003 | Marino et al. ................. 425/371 |
| 2004/0211323 A1 | * | 10/2004 | Heinzen et al. .................. 99/349 |

OTHER PUBLICATIONS

Pear, Walnut and Gargonzola Pizzas Google date (Aug. 10, 2011).*
Whole Wheat Tortilla Wrap Apr. 1, 2002 available at http://fatsecret.com/calories-nutrition/weight-watchers/whole-wheat-tortilla-wrap.*
Whole Wheat Tortilla Wrap Google Date (Aug. 10, 2011).*
Functionality of Bicarbonate Leaveners in Wheat Flour Tortillas, Bejosano et al.. Cereal Chem 81(1), p. 77-79, vol. 81, No. 1 (2003).*

* cited by examiner

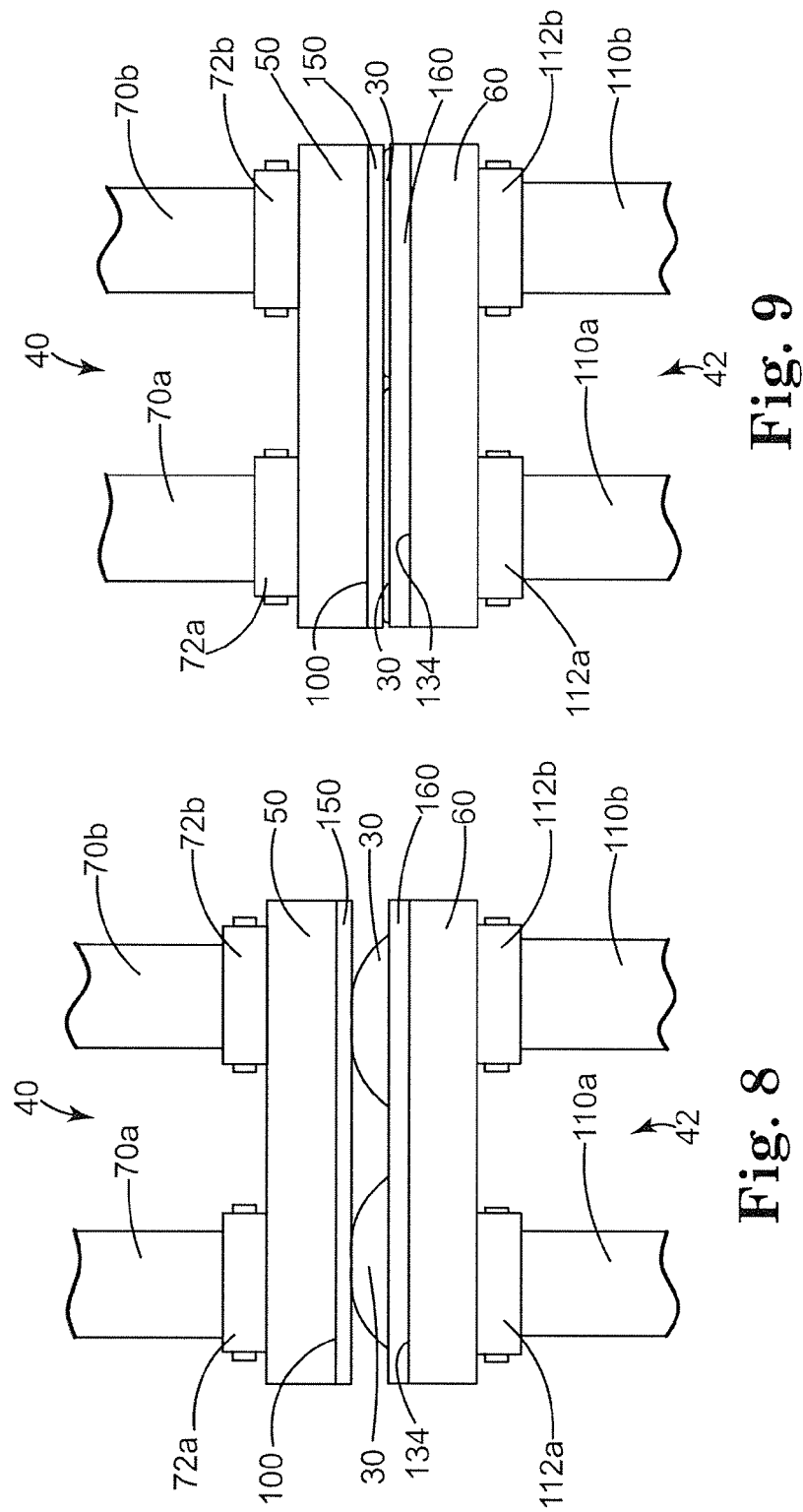

APPARATUS AND METHOD FOR FORMING A PRESSED, BAKED FOOD PRODUCT

CROSS-REFERENCE TO RELATED APPLICATIONS

This application claims the benefit of priority under 35 U.S.C. 119(e)(1) of a provisional patent application Ser. No. 60/584,907, filed Jul. 1, 2004, and PCT Application Number PCT/US05/22129, filed Jun. 22, 2005 which are incorporated herein by reference in its entity.

BACKGROUND

The present invention relates generally to an apparatus and method for forming food products. More particularly, the present invention relates to an apparatus and method for forming generally flat, baked, farinaceous food products such as tortillas, taco shells, snacks and the like in a continuous fashion.

A wide variety of processes are known for forming dough intermediates into final products. Examples of such products include tortillas, pizza crusts, piecrusts, pastries, and cookies, as well as snack products, including chips or crisps and fruit snacks.

It is widely recognized that many aspects of the manufacturing processes can have a substantial impact on the price that a consumer pays for the product. Usually, the cost of a product decreases in proportion to an increase in the speed with which the product can be fabricated. Additionally, process improvements that simplify the associated equipment may lead to decreases in the costs of obtaining and operating such equipment.

In the manufacturing of flat products, such as tortillas, piecrusts, snack products, and the like, efforts have been increasingly directed toward reducing costs and increasing the speed of production. Traditionally, several manufacturing techniques have been utilized for economically and quickly forming tortillas on commercial production lines. A first popular method is known as die-cutting and a second popular method is known as pressing, both of which are described below.

In the die-cutting technique, dough is first formed in a commercial mixer. The dough is then transferred to an extruder that extrudes a sheet of dough onto a conveyor belt of a rolling and cutting machine to form a dough ribbon. In this step, the dough ribbon is gradually reduced to a predetermined thickness by sheeting and cross-rolling. Once the dough has reached a desired thickness, a die is actuated to cut the dough into the desired form. The formed dough products (or dough intermediates) are then separated from the remaining dough ribbon trim or "matrix" and are moved to an oven where they are cooked. The matrix is usually returned to the extruder for reprocessing.

Several problems and limitations exist with the die-cutting method described above. One such problem is that the remaining matrix is often mixed with one or more particular ingredients. For example, the dough ribbon is often coated with topical flour or starch prior to cutting to prevent the die from sticking to the dough. When this dough and flour is reprocessed, the extra flour and floor time can produce undesirable properties within the dough. For example, the topical flour can inhibit re-mixing, causing the subsequently processed dough product (e.g. tortilla) to be substantially inflexible or brittle, and can produce an undesirable taste in the product. In addition, having the dough products produced by this method usually imparts a rheoligical bias in the direction of sheeting to the resultant product. That is, the tortilla (or other resultant product) will crack when folded in the direction that is transverse or perpendicular to the direction of the sheeting. Moreover, the sheeting process described above does nothing to seal the surface of the dough. Sealing the surface of the dough traps leavening gasses during baking, which has been found to improve final bake quality of the product.

As mentioned above, a second common process for forming tortillas (or other dough-based, flatten products) is by pressing, which is also referred to as a hot press method. In practice, dough intermediate balls are formed, proofed, and fed onto a conveyor that carries several dough balls at a time into position between heated platens (up to 232° C. (450° F.)) of a tortilla press. Such relatively high temperatures must be imparted to the dough balls by the platens to overcome the inherent elastic tendency of the dough to snap-back after pressing. In other words, without sufficiently heating the dough, the pressed dough will typically thicken and shrink in size, snapping-back to a much smaller size. In addition, dough properties can vary from batch to batch, and may also vary significantly within a single batch. This creates further problems in providing a consistent and uniform product from a consumer standpoint.

In the pressing process, a batch of dough intermediate balls is transferred by a conveyer to a position between heated press platens. The conveyor is then stopped and the press is closed, compressing the balls into circularly shaped tortilla intermediates (or other food product) that are then transferred into an oven for baking. To this end, the press operation is characterized as including a compression period (during which the platens are driven to a desired spacing) followed by a holding period (during which the platens are maintained at the desired spacing). Using this method, the tortillas may be formed at reasonable production speeds; however, the time required for opening and closing the press and indexing the belt carrying the dough severely limits production to about 14 to 16 press strokes per minute. Generally, the press is the rate limiting step of a continuous production line. Further, the accepted technique of "proofing" the dough balls prior to pressing can significantly increase overall press processing time. In general terms, proofing entails placing the formed dough balls in a temperature and humidity controlled environment (typically 32° C. (90° F.), 70% relative humidity) for a period of time on the order of 5-15 minutes. It is believed that this processing step is essential to relax the gluten structure inherent to the dough intermediate balls, thereby lessening potential snap-back. Though viewed as being a press process requirement and reducing compression force output requirements of the pressing itself, proofing undoubtedly increases production time.

In addition to limited production speeds, the pressing method suffers from other drawbacks. For example, the individual components are more expensive as compared to machinery associated with the die-cutting technique. Moreover, the intermittent, reciprocating movement and engagement of the platens adds further complexity to the system. Additionally, alignment of the dough intermediate balls with the press platens increases the difficulty in operating the equipment and may contribute to other problems, such as misalignment which can lead to the tortillas (or other resultant food product) being irregular (e.g., not perfectly circular) or having a non-uniform thickness, such that they are not of an acceptable quality.

What is needed therefore is an apparatus and method that overcomes the difficulties set forth above and which can process flat, baked food products in an efficient manner while maintaining consistently good, quality products.

SUMMARY

One aspect of the present invention relates to a method of making a farinaceous, flat, baked food product. The method includes first providing a dough intermediate puck. The dough intermediate puck is then processed through a first, compression station. To this end, the first station applies a compression force and heat to the dough intermediate puck, resulting in a pressed puck. The pressed puck is then processed through a second, dwell station. The second station contacts opposing major faces of the pressed puck in a manner allowing the pressed puck to naturally rise and applies heat to the puck. Processing by the second station results in a pressed, at least partially-baked, food product. In this regard, the above steps are characterized by continuous movement of the puck, such that the puck continuously moves from an upstream end of the first station to a downstream end of the second station. Finally, the food product is removed from the second station. In one preferred embodiment, a carrier, such as one or two continuous belts, is provided that continuously moves the puck within and from the first station to and within the second station. With this one preferred embodiment, the method further includes heating the carrier in the first station such that the carrier retains heat and further conducts retained heat on to the puck in the second station.

Another aspect of the present invention relates to a system for forming a baked, pressed food product from a dough intermediate. The system includes a first, compression station and a second, dwell station. The first station defines an upstream end and a downstream end, and includes first and second platen assemblies. The first platen assembly includes a first platen and a heating element for heating the first platen. Similarly, the second platen assembly includes a second platen and a heating element for heating the second platen. With this in mind, the first and second platen assemblies are positioned opposite one another and combine to define a converging region and a holding region. The converging region extends from the upstream end, whereas the parallel region extends from the converging region to the downstream end. A convergent spacing is established between the first and second platens along the converging region. Conversely, a relatively uniform, minimum spacing is established between the first and second platens along the holding region. The second station defines upstream and downstream ends, with the upstream end of the second station positioned adjacent the downstream end of the first station. Further, the second station includes first and second belts positioned opposite one another and combining to define a dwell and heating region. The first belt is associated with the first platen assembly so as to contact the first platen along at least the holding region. The first belt includes a belt segment extending from the downstream end of the first station. The second belt is associated with the second platen assembly so as to contact the second platen along at least the holding region. The second belt includes a belt segment extending from the downstream end of the first station. With this in mind, the opposing belt segments define a spacing at least initially approximating a spacing of the holding region such that an article entering the second station from the first station is contacted by the first and second belts. Finally, the system is configured to continuously move an article from the upstream end of the first station to the downstream end of the second station. In one embodiment, the first and second belts are continuous belts.

Another aspect of the present invention relates to a method of making a baked farinaceous flat food product. The method includes first providing a quantity of farinaceous dough having an initial temperature. The dough is then pressed for a first time between upper and lower surfaces of a confinement zone. To this end, a sufficient compression force is placed on the dough to form a flattened dough piece having opposed major surfaces. The flattened dough piece is then maintained in the confinement zone and heated for a second time to heat the flattened dough piece to an internal temperature of at least 80° C. to form a flattened heated dough piece. Subsequently, the flattened heated dough piece is baked in the confinement zone while at least maintaining the internal temperature above 90° C. for a third baking time to provide an at least partially baked food product. In one embodiment, the upper and lower surfaces of the confinement zone remain in contact with respective ones of the opposed major surfaces during the steps of heating and baking.

Yet another aspect of the present invention relates to a packaged good article including at least one tortilla disposed within a sealed food package. The food package is fabricated from a flexible packaging film. With this in mind, the tortilla has a water activity value (Aw) ranging from about 0.8 to 0.9, a total sodium salts of leavening acids of less than 100 ppm, a degree of gelatinization of at least about 90% as determined by differential scanning calorimetry, and opposing major surfaces with less than about 5% translucent area.

BRIEF DESCRIPTION OF THE DRAWINGS

FIGS. 7-9 are partial, side views showing processing of dough intermediate pucks within the first processing station of FIG. 2.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Throughout the specification and claims, percentages are by weight (dry weight basis) and temperature in degrees Celsius unless otherwise indicated.

Figure 1:
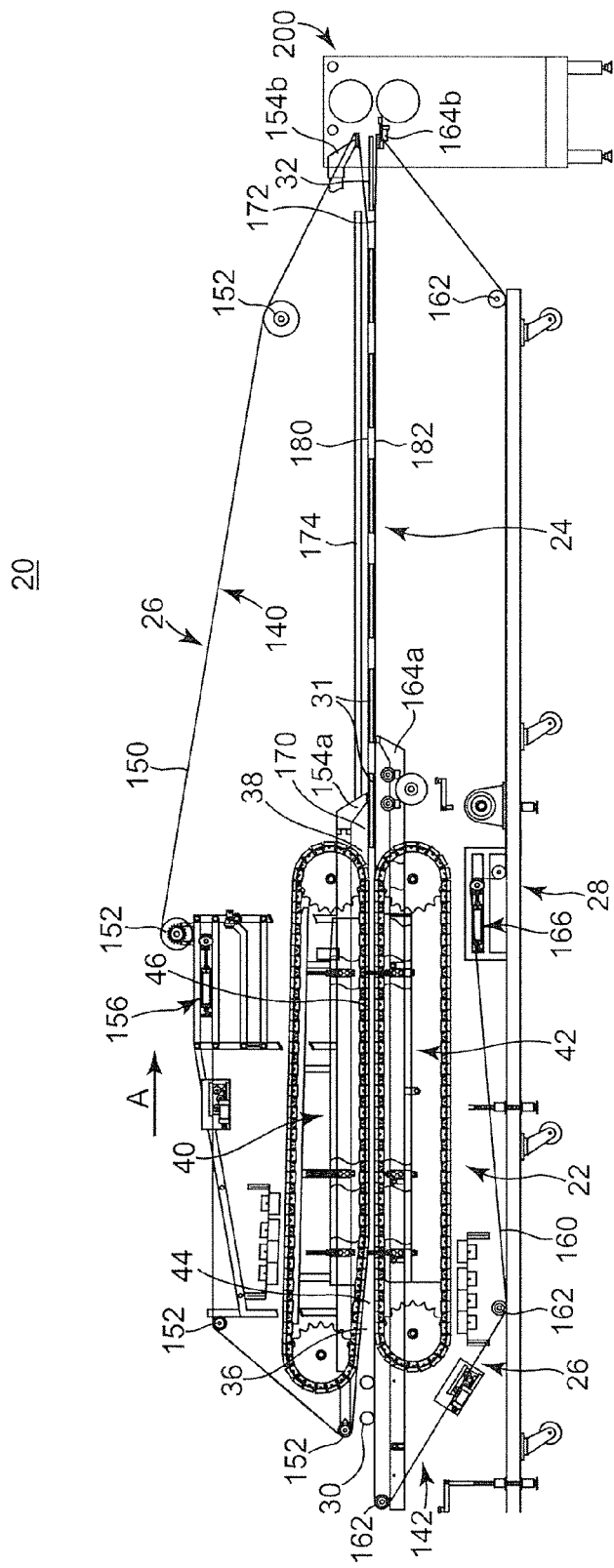
FIG. 1 is a schematic side view of a food product processing system in accordance with the present invention, illustrating first and second processing stations.

The present invention is directed to systems and methods for processing dough intermediate pucks into pressed, baked food products. With this in mind, one embodiment of a food product processing system 20 is illustrated in FIG. 1. The system 20 includes a first station 22, a second station 24 and a carrier 26 that, in one embodiment, are supported by a common frame 28. As described in greater detail below, the stations 22, 24 and the carrier 26 are adapted to continuously process food products, and in particular to process dough intermediates 30 (referenced generally in FIG. 1) to pressed, baked food products 32 (referenced generally in FIG. 1). Residual heat from the first station 22 is used by the second station 24 to effectuate baking within the second station 24. Further, the stations 22, 24 combine to define a confinement zone in which dough is pressed, heated, and baked.

The system 20 defines a machine direction (shown by a left-to-right arrow "A" in FIG. 1) such that during operation, product flow, via the carrier 26, is from the first station 22 to the second station 24. With this in mind, then, the first station 22 defines an upstream end 36 and a downstream end 38. In one embodiment, the first station 22 includes a first platen assembly 40 and a second platen assembly 42 combining to define the upstream and downstream ends 36, 38. As described below, the platen assemblies 40, 42 are, in one embodiment, highly similar, and are arranged opposite one another to form a converging region 44 and a holding region 46.

Figure 2:
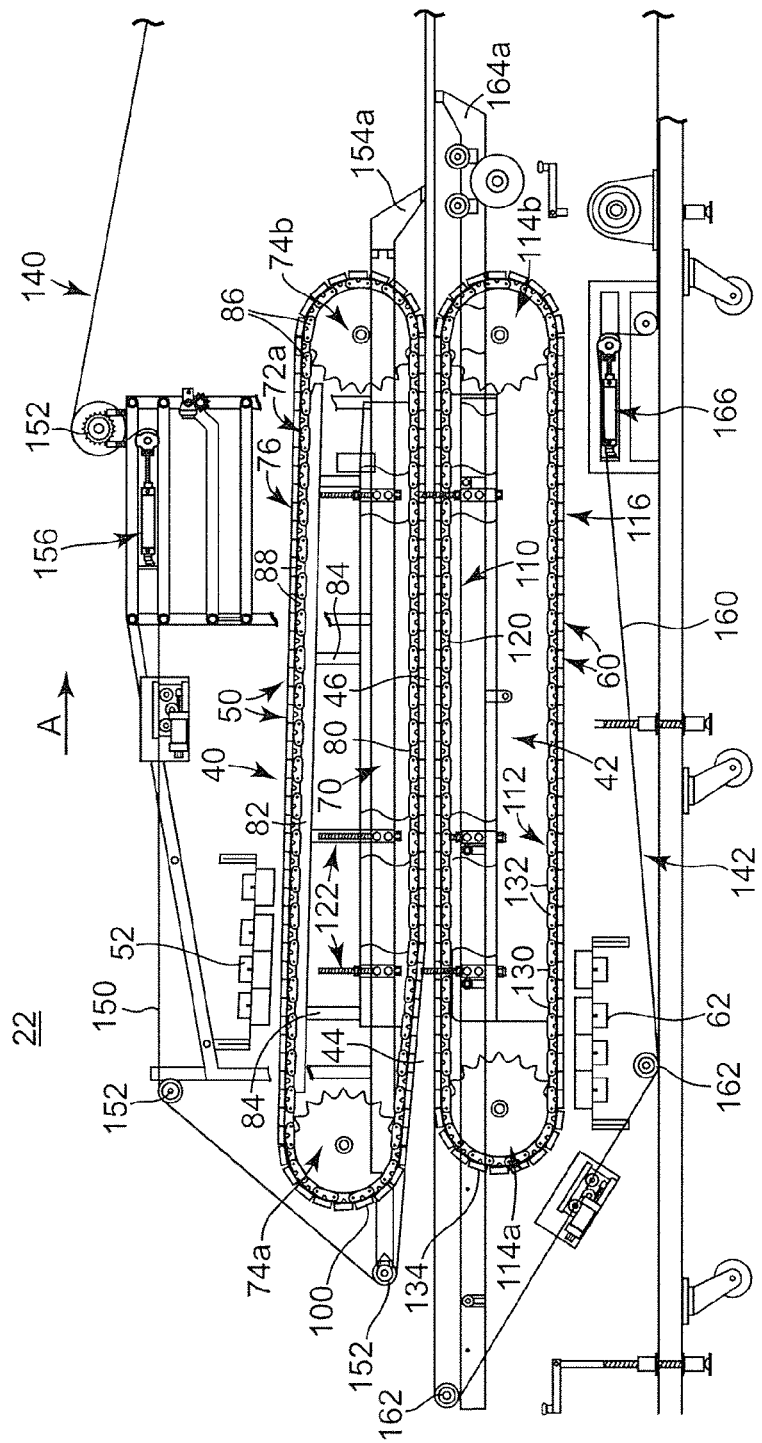
FIG. 2 is an enlarged side view of a portion of the system of FIG. 1, including the first processing station.

With reference to FIG. 2, the first platen assembly 40 includes at least one, preferably a plurality of, platen(s) 50 and a heating element 52. The heating element 52 serves to heat the platen(s) 50, with the first platen assembly 40 being configured to desirably position the platen(s) 50 at the converging region 44 and the holding region 46. Similarly, the second platen assembly 42 includes at least one, preferably a plurality of, platen(s) 60 and a heating element 62. Once again, the heating element 62 serves to heat the platen(s) 60, with the second platen assembly 42 being configured to desirably position the platen(s) 60 at the converging region 44 and the holding region 46.

Figure 3:
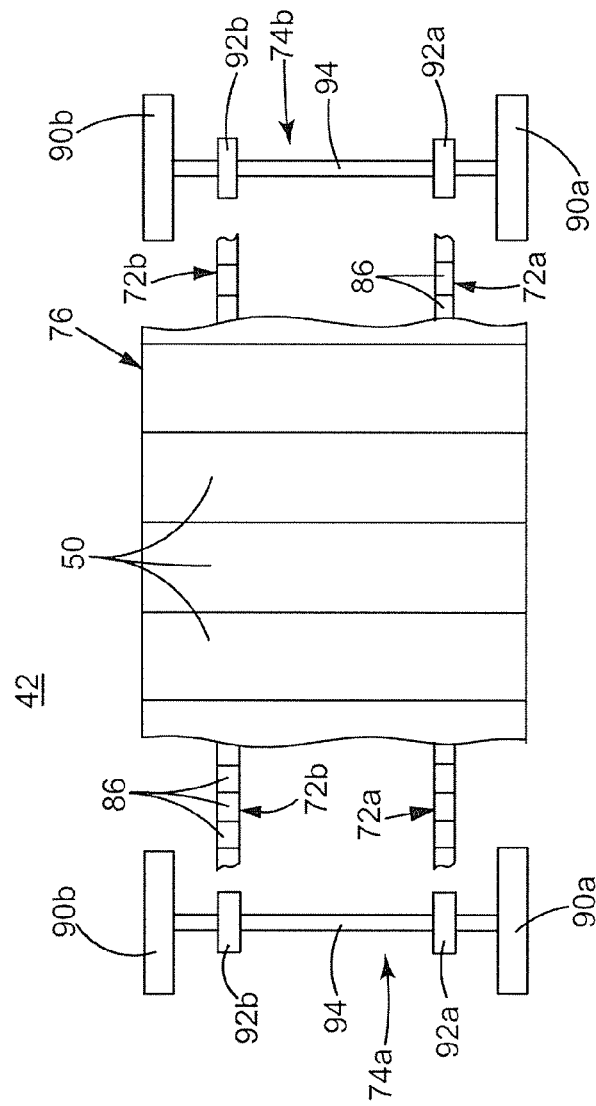
FIG. 3 is a partial schematic top view of a portion of a first platen assembly of the first processing station of FIG. 2.

With the above general elements in mind, in one embodiment, and with additional reference to FIG. 3 (otherwise depicting a portion of the first platen assembly 42), the first platen assembly 42 includes guides 70 (one of which is shown in FIG. 2), opposing drive chains 72a, 72b, opposing gear assemblies 74a, 74b, a drive motor (not shown), a platen band 76, and the heating element 52. The drive chains 72a, 72b and the platen band 76 extend about and between the opposing gear assemblies 74a, 74b. In particular, the drive chains 72a, 72b are operatively connected to the gear assemblies 74a, 74b such that upon forced rotation of one or both of the gear assemblies 74a or 74b via the drive motor, movement is imparted on to the drive chains 72a, 72b. Movement of the drive chains 72a, 72b, in turn, is translated to the platen band 76, causing the platen band 76 to move along a defined path dictated by the guides 70. The heating element 52 serves to heat the platen band 76.

The guides 70 can assume a variety of forms, and are, in one embodiment, mounted to the frame 28. Relative to the view of FIG. 2, only one of the guides 70 is shown, and is positioned so as to contact the first drive chain 72a. In one embodiment, a second, identical guide (not shown in FIG. 2) is positioned to interface with the second drive chain 72b (FIG. 3). Alternatively, a single guide can be provided, sized to interface with both of the drive chains 72a, 72b. Regardless, the guide(s) 70 forms a guide surface 80 (referenced generally in FIG. 2) at an underside thereof for guiding and maintaining the corresponding drive chain 72a or 72b at a desired position or spacing relative to the second platen assembly 42, as described below. In one embodiment, the guide(s) 70, and in particular the guide surface 80 thereof, is formed of a hardened material capable of maintaining its structural integrity with forced contact against the drive chain 72a and/or 72b that is otherwise moving relative to the guide surface 80.

In one embodiment, the first platen assembly 40 further includes a secondary guide member 82 rigidly connected to a corresponding one of the guides 70 by arms 84. The secondary guide member 82 supports the corresponding drive chain 72a or 72b opposite the guide 70, and is mounted to the frame 28. A length of the guide 70 and the corresponding secondary guide member 82, as well as a spacing therebetween as otherwise dictated by the arms 84, are selected based upon a circumferential length of the corresponding drive chain 72a or 72b and the platen band 76. In particular, the guide 70 and the corresponding secondary guide member 82 are sized and positioned to maintain the corresponding drive chain 72a or 72b and the platen band 76 under a slight tension.

The drive chains 72a, 72b are preferably identical and each forms a continuous loop. While with the embodiment of FIGS. 1-3 two of the drive chains 72a, 72b are provided, any other number is equally acceptable. For example, where a machine width of the system 20 is relatively large, three or more of the drive chains 72a, 72b can be provided; conversely, where a machine width is relatively narrow, only one of the drive chains 72a, 72b need be included. Regardless, the drive chains 72a, 72b are moveably connected to the gear assemblies 74a, 74b, and ride along one or both of the guide(s) 70 and the secondary guide member(s) 82 as described below, with each drive chain 72a, 72b consisting of a multiplicity of individual, interconnected links 86. In one preferred embodiment, the drive chains 72a, 72b are roller chains, and include rollers 88 (referenced generally in FIG. 2), individual ones of which are associated with individual ones of the links 86.

In one embodiment, the gear assemblies 74a, 74b are identical, each including driven gears 90a, 90b and drive gears 92a, 92b each connected to an axle 94. The driven gears 90a, 90b define a toothed outer surface (not shown in FIG. 3) for connection to a drive motor (not shown). Similarly, the drive gears 92a, 92b each form a toothed outer surface (not shown in FIG. 3) for meshing engagement with links 86 of a respective one of the drive chains 72a or 72b. With this configuration, the drive motor causes the driven gears 90a, 90b to rotate the axle 94. This rotation, in turn, is translated to the drive gears 92a, 92b, and thus to the drive chains 72a, 72b, imparting movement of the drive chains 72a, 72b along the loop defined thereby. Alternatively, the gear assemblies 74a, 74b can assume a wide variety of other forms capable of facilitating driven movement of the drive chains 72a, 72b along a defined path.

The platen band 76 includes, in one embodiment, a plurality of the platens 50 interconnected to one another. The platens 50 are preferably identical, each having a generally flat or planar pressing surface 100 for pressing a food intermediate, such as for pressing a tortilla or the like. Alternatively, the pressing surface 100 can form a cavity adapted for shaping food product to a desired shape, such as for shaping a cookie product, pie shell, or the like. Regardless, in one embodiment, the platens 50 are interconnected to one another via the drive chains 72a, 72b. For example, in one embodiment, individual ones of the platens 50 are mounted on opposite ends thereof to corresponding links 86 of the first and second drive chains 72a, 72b, respectively. With this configuration, the platen band 76 moves with movement of the drive chains 72a, 72b, with each platen 50 following an identical path of travel. Alternatively, the platen band 76 can be configured to interconnect the platens 50 apart from the drive chains 72a, 72b, such as by hinges, wires, cables or links. Regardless, the platen band 76 is preferably continuous.

Finally, the heating element 52 is provided to heat the platens 50 of the first platen assembly 40, and can comprise any conventional device such as electric or fuel fired radiant heaters, or can be a convective heat transfer mechanism such as by using forced air to heat the platens 50. In one embodiment, the heating element 52 is connected to a sensor (not shown) for sensing the temperature of the platens 50. For example, sensors such as thermocouples or infrared sensor(s) can be positioned with respect to the platens 50 in order to measure the temperature of the platens 50. Additionally, the sensor(s) can be utilized in combination with a control system (not shown) capable of providing feedback to the heating element 52 (and/or the heating element 62 of the second platen assembly 42) for adjustably controlling the temperature of the platens 50.

The second platen assembly 42 is preferably highly similar to the first platen assembly 40 previously described, and includes guides 110 (one of which is shown in FIGS. 1 and 2), drive chains 112 (one of which is shown in FIGS. 1 and 2), opposing gear assemblies 114a, 114b, a platen band 116, a drive motor (not shown) and the heating element 62. As with the first platen assembly 40, the drive chains 112 and the platen band 116 extend about and between the opposing gear assemblies 114a, 114b. In particular, the drive chains 112 are operatively connected to the gear assemblies 114a, 114b such that upon forced rotation of one or both of the gear assemblies 114a or 114b via the drive motor, movement is imparted on to the drive chains 112. Movement of the drive chains 112, in turn, is translated to the platen band 116, causing the platen band 116 to move along a defined path dictated by the guides 110. The heating element 62 serves to heat the platen band 116.

Figure 4:
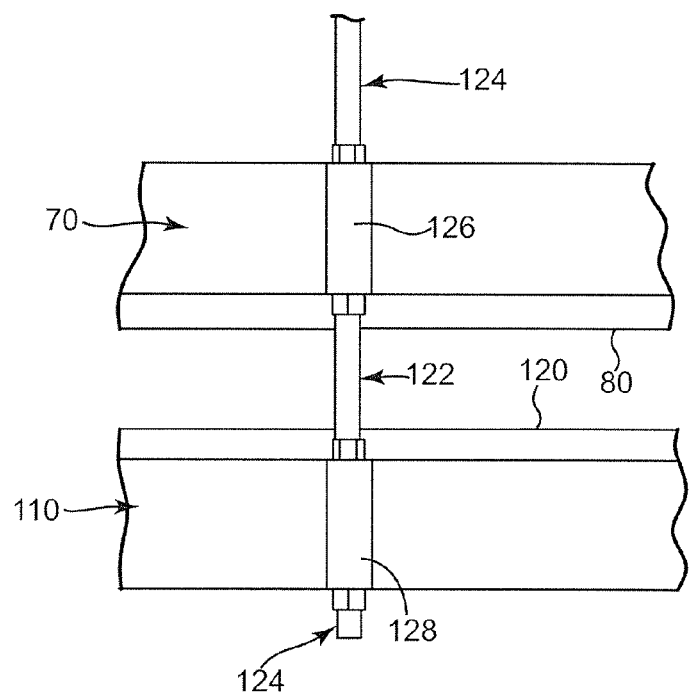
FIG. 4 is an enlarged, partial side view of a positioning device in accordance with the present invention for adjustably positioning a first guide relative to a second guide.

Similar to the first platen assembly 40, the second platen assembly 42 includes, in one embodiment, two of the guides 110 each positioned to interact with a respective one of the drive chains 112. Thus, relative to the view of FIG. 2, a second guide (not shown) is positioned opposite (or behind) the guide 110 shown. Alternatively, a single guide 110 can be provided. Regardless, the guide 110 forms a guide surface 120 (referenced generally in FIG. 2), and is positioned such that the guide surface 120 contacts the corresponding drive chain 112 along the converging region 44 and the holding region 46. Further, the guides 110 are mounted to the frame 28, preferably in a manner that allows for selective positioning (and thus spacing) of the each of the guides 110 relative to a corresponding one of the guides 70 associated with the first platen assembly 40. For example, in one embodiment and with respect to the guides 70, 110 shown in FIG. 2, the guide 70 is connected to the guide 110 by a plurality of spacing devices 122. As best shown in FIG. 4, the spacing devices 122 each include a threaded rod 124, a first head 126 and a second head 128. The first head 126 is mounted to the guide 70, whereas the second head 128 is mounted to the guide 110. The threaded rod 124 is threadably connected to the first and second heads 126, 128. With this configuration, the rod 124 can be rotated relative to one or both of the heads 126, 128 (or vice-versa) to effectuate a desired spacing between the guides 70, 110, and thus between the respective guide surfaces 80, 120. Alternatively, a number of other mounting configurations can be employed. Even further, the guides 70, 110 need not be directly connected to one another.

Returning to FIG. 2, the drive chains 112 are preferably identical to the drive chains 72a, 72b previously described, and are, in one embodiment, roller chains having individual links 130 and rollers 132 (referenced generally in FIG. 2). Similarly, the gear assemblies 114a, 114b are preferably identical to the gear assemblies 74a, 74b previously described. As such, the drive chains 112 are operatively connected to the gear assemblies 114a, 114b such that driven rotation of one or both of the gear assemblies 114a, 114b causes the drive chains 112 to move along a path defined in part by the guides 110. In this regard, one or both of the gear assemblies 114a, 114b can be driven by the motor (not shown) otherwise driving the gear assemblies 74a, 74b, or by a separate motor.

The platen band 116 includes, in one embodiment, a plurality of the platens 60 interconnected to one another. In one embodiment, interconnection of the platens 60 is achieved by mounting individual ones of the platens 60 to respective ones of the links 130. Alternatively, other constructions for the platen band 116 can be employed as previously described for the platen band 76. Regardless, the platens 60 each define a pressing surface 134 (referenced generally), and the platen band 116 is assembled such that the platen band 116 moves with movement of the drive chains 112.

Finally, the heating element 62 is provided to heat the platens 60, and can assume any of the forms previously described with respect to the heating element 52, and can include one or more temperature sensors (not shown). Further, the heating element 62 can be linked to the same control system (not shown) as the heating element 52 associated with the first platen assembly 40 such that the platens 50 of the first platen assembly 40 and the platens 60 of the second platen assembly 42 can be maintained at approximately the same temperature.

Figure 5:
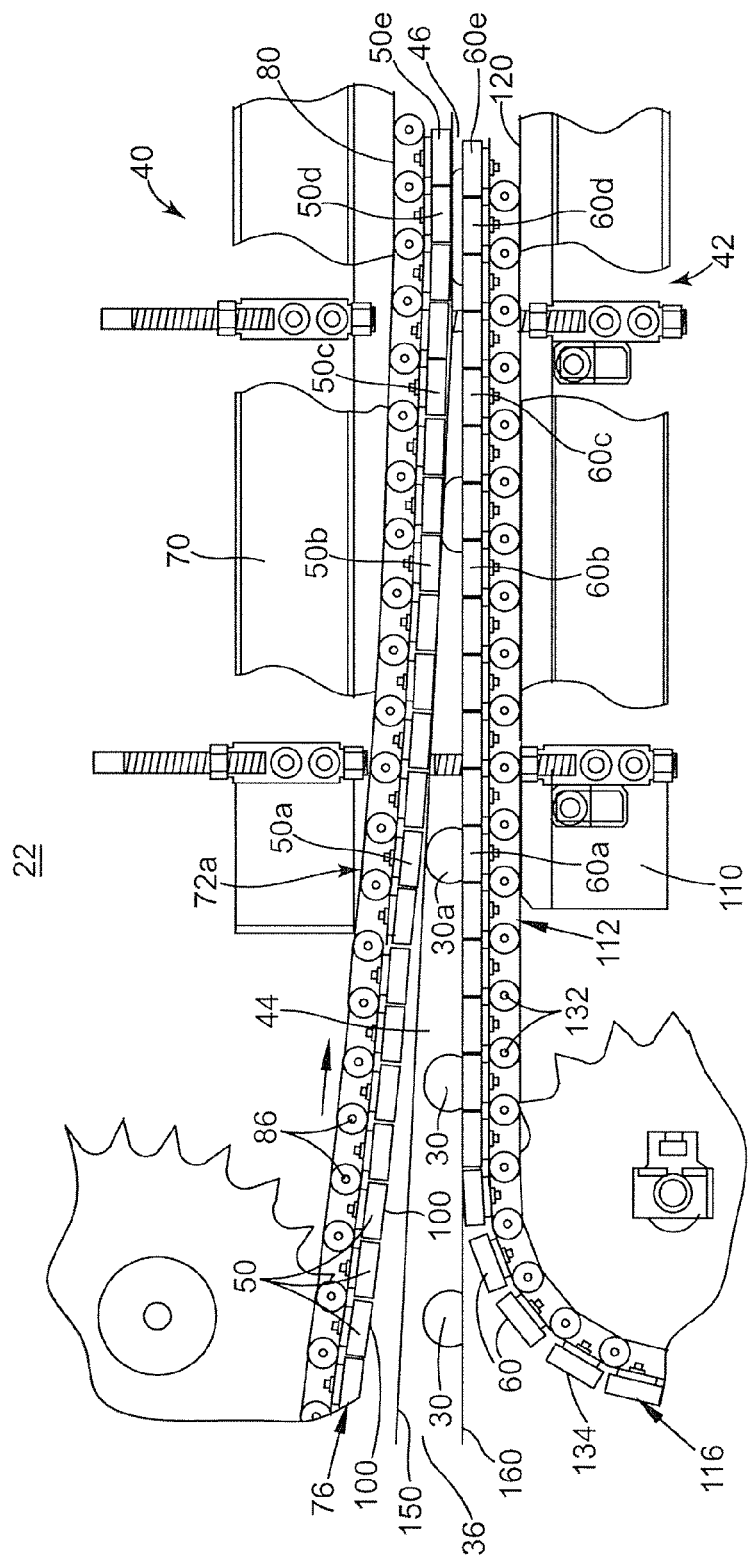
FIG. 5 is an enlarged, partial side view of a portion of the first processing station of FIG. 2, illustrating processing of dough intermediate pucks.

Upon final assembly, and with specific reference to FIGS. 2 and 5, the first and second platen assemblies 40, 42 are positioned opposite one another such that the platen bands 76, 116 face one another within the first station 22. More particularly, the pressing surface 100, 134 of individual ones of the platens 50, 60, respectively, face one another, combining to define the converging region 44 and the holding region 46 as dictated by an interface between the platen bands 76, 116 and the corresponding guides 70, 110. To this end, FIG. 5 more clearly illustrates a relationship between the drive chains 72a, 112 and the guides 70, 110, respectively. Once again, the platen band 76 is attached to the drive chain 72a, whereas the platen band 116 is attached to the drive chain 112. The first platen assembly 40 is configured such that a position of the drive chain 72a, and thus the platen band 76, is dictated by the guide 70. More particularly, the rollers 86 of the drive chain 72a ride along the guide surface 80 of the guide 70. Similarly, the rollers 132 of the drive chain 112 ride along the guide surface 120 of the guide 110.

The converging region 44 initiates adjacent the upstream end 36 of the first station 22, and is characterized by the platens 50, 60 converging toward one another with translation of the platen bands 76, 116. Thus, a spacing between corresponding ones of the platens 50, 60 decreases along the converging region 44 downstream of the upstream end 36 (via convergent spacing between the corresponding guides 70, 110). By way of example, and with specific reference to FIG. 5, the platen band 76 can be described as including first, second, and third platens 50*a*, 50*b*, and 50*c*, whereas the platen band 116 can be described as including first, second, and third platens 60*a*, 60*b*, and 60*c*. Further, the platen bands 76, 116 are arranged such that the first platens 50*a*, 60*a* are generally aligned, the second platens 50*b*, 60*b* are generally aligned, and the third platens 50*c*, 60*c* are generally aligned with corresponding movement of the platen bands 76, 116 as previously described. With these conventions in mind, a spacing between the first platens 50*a*, 60*a* in the converging region 44 is greater than a spacing between the second platens 50*b*, 60*b*, that in turn is greater than a spacing between the third platens 50*c*, 60*c*. With this configuration, then, the converging region 44 is configured to subject an article traveling along the converging region 44 to a gradually increasing compressive force (assuming that the article being processed has a height (or thickness) that is greater than a minimal spacing defined along the converging region 44).

The holding region 46, on the other hand, is characterized by a relatively uniform spacing between the platen bands 76, 116, with this spacing maintaining or "holding" an article traveling along the holding region 46 at the desired thickness (or height). By way of further example, the platen band 76 can further be described as including fourth and fifth platens 50*d*, 50*e*, whereas the platen band 116 includes fourth and fifth platens 60*d*, 60*e*. Once again, the platen assemblies 40, 42 are arranged such that the fourth platens 50*d*, 60*d* are generally aligned and the fifth platens 50*e*, 60*e* are generally aligned with corresponding movement of the platen bands 76, 116. With these conventions in mind and in one embodiment, within the holding region 46, a spacing between the fourth platens 50*d*, 60*d*, is approximately identical (plus or minus 5%) to a spacing between the fifth platens 50*e*, 60*e*, with this spacing approximating a minimum spacing achieved along the converging region 44. Alternatively, the holding region 46 can be configured to provide slight increases or decreases in platen spacing (on the order of 0.10 inch). Regardless, a platen spacing within the holding region 46 represents a predetermined gap spacing provided by the first station 22. As an article (such as the dough intermediate 30) is transferred from the converging region 44 and through the holding region 46 to the downstream end 38 (FIG. 2) of the first station 22, a desired reduced end thickness is imparted to the article. In terms of a compression force applied to an article traveling through the holding region 46, the compression experience by the article is a function of the article's material properties. In theory, the converging region 44 applies a maximum compressive force to the article, forcing the article to a reduced thickness. The holding region 46 rigidly prevents the article from expanding or returning to an increased thickness. For an elastic material that more readily reverts back to an initial thickness (i.e., thickness prior to processing by the converging region 44), the holding region 46 will effectively be placing a compressive force onto the article, resisting this expansion. For a less elastic material, less force will be placed upon the article along the holding region 46 because the article more readily maintains the pressed, reduced thickness and thus expands or presses against the platens 50, 60 to a lesser extent in the holding region 46. In sum, the holding region 46 serves to counteract or resist any expansion forces generated by the article, and rigidly maintains a predetermined platen spacing.

In addition to the platen assemblies 40, 42 previously described, a portion of the carrier 26 is also provided within first station 22. With this in mind, and with reference to FIG. 1, in one embodiment, the carrier 26 includes a first belt assembly 140 positioned opposite a second belt assembly 142. The first belt assembly 140 is associated with the first platen assembly 40, whereas the second belt assembly 142 is associated with the second platen assembly 42. As described in greater detail below, the belt assemblies 140, 142 act in concert to transfer articles (such as the dough intermediates 30) to and through the first and second stations 22, 24, and define upper and lower surfaces of a confinement zone in which articles are pressed and heated (e.g., within the first station 22), and baked (e.g., within the second station 24).

In one embodiment, the first belt assembly 140 includes an endless belt 150, a plurality of roller guides or pulleys 152, nosebar guides 154*a*, 154*b*, and a tensioning mechanism 156. The guides 152, 154*a*, 154*b* support the belt 150 along a defined path, with the tensioning mechanism 156 providing a desired tension to the belt 150. During operation, the belt 150 moves along the defined path dictated, at least in part, by the first platen assembly 40.

The endless belt 150 can assume a variety of forms, but is preferably constructed of a durable material capable of maintaining its structural integrity over extended periods of use. In one embodiment, an outer surface (unnumbered in FIG. 1, but represented by the surface facing the away from or not otherwise contacting the platen band 76) of the belt 150 consists of, or is coated with, a non-stick, heat-retaining material, such as Teflon®. Alternatively, other non-stick, heat retaining materials such as silicone, etc. are equally useful. However, this non-stick coating is not a required element. In one embodiment, an entirety of the endless belt 150 is comprised of a Teflon® material. In other embodiments, the endless belt 150 is a Teflon®/fiberglass composite, steel or stainless steel, or Teflon®-coated steel or stainless steel. Regardless, the outer surface of the endless belt 150 is adapted so as to minimize the opportunity for articles being process by the system 20 (such as the dough intermediates 30) to stick to the endless belt 150; further, the endless belt 150 retains heat for reasons described in greater detail below.

The pulleys or rollers 152 and the nosebar guides 154*a*, 154*b* are mounted to the frame 28 at various locations. To this end, more or less of the pulleys 152 and/or nosebar guides 154*a*, 154*b* can be provided, and/or other guiding devices can be employed, and locations of these components can vary from that illustrated in FIG. 1. Regardless, and with additional reference to FIG. 2, the pulleys 152 and the nosebar guides 154*a*, 154*b* position the endless belt 150 such that the endless belt 150 contacts the platen band 76 along at least the holding region 46, and more preferably along both the converging region 44 and the holding region 46. In one embodiment, the nosebar guide 154*a* is rotatably connected to the frame 28, and maintains the endless belt 150 in a generally planar orientation relative to a plane defined by the holding region 46. The tensioning mechanism 156 can be operated to apply tension to the belt 150 to ensure desired interface with the platen band 76. Regardless, the belt 150 is preferably driven along the defined path with movement of the platen band 76, such that the platen band 76 and the belt 150 move at approximately the same surface speed. Alternatively, a separate drive motor (not shown) can be provided for moving the belt 150 along the defined path at a desired speed. To this end, with the one configuration of the system 20 of FIGS. 1 and 2 where the belt tensioner 156 contacts a "working face" (i.e., the face that otherwise contacts the dough intermediates 30) of the belt 150, the tensioner 156 is preferably driven or rotated at the same speed as the belt 150 to avoid scratching the working face. Alternatively, the belt tensioner 156 can be configured to not contact the working face of the belt 150. Even further, with varying constructions of the endless belt 150 (such as where the endless belt 150 is formed of steel), one or more of the rollers 152 and/or guides 154*a*, 154*b* will preferably vary from that shown in FIGS. 1 and 2. For example, a steel endless belt 150 will not readily traverse a nosebar guide, such that the nosebar guides 154a, 154b can be replaced with other guide components. Similarly, the rollers 152 can have a larger diameter as compared to a construction associated with a Teflon® endless belt 150.

With continued reference to FIGS. 1 and 2, the second belt assembly 142 is, in one embodiment, highly similar to the first belt assembly 140, and includes an endless belt 160, a plurality of rotatable rollers or pulleys 162, nosebar guides 164a, 164b and a tensioning mechanism 166. The pulleys 162 and the guides 164a, 164b can again vary from that illustrated in FIG. 1, and serve to define a path for the endless belt 160 that includes contacting the platen band 116 of the second platen assembly 42. The endless belt 160 is constructed such that at least an outer surface thereof (i.e., the surface facing away from the platen belt 116 along the converging and parallel regions 44, 46) has non-stick, heat retaining characteristics, such as with Teflon® material. Once again, other constructions for the endless belt 160 are also acceptable. Further, in one embodiment, the nosebar guide 164a is mounted to the frame 28 and dictates a planar extension of the belt 160 relative to a plane of the holding region 46. With the one embodiment of FIGS. 1 and 2, the tensioning mechanism 166 is preferably driven or rotated at the same speed as the belt 160. Alternatively, the tensioning mechanism 166 can be configured to not contact the working face of the belt 160.

Relative to the orientation of FIG. 1, the belt 150 can be described as an upper belt, and the belt 160 can be described as a lower belt. As best shown in FIG. 2, the upper belt 150 contacts the platen band 76 and the lower belt 160 contacts the platen band 116 within the first station 22. In addition to, in one embodiment, causing movement of the belts 150, 160 with movement of the corresponding platen bands 76, 116, this relationship results in heating of the belts 150, 160 by the platen bands 76, 116. As previously described, individual ones of the platens 50 are heated by the heating element 52, whereas individual ones of the platens 60 are heated by the heating element 62. Upon contacting the corresponding endless belt 150 or 160, heat from the heated platens 50 or 60 is conducted to the belt 150 or 160, respectively. Alternatively, the belts 150, 160 can be heated in other manners, such as by convection or radiation. For example, the second station 24 can include one or more discrete heating devices (not shown) that further heat one or both of the belts 150, 160. In one embodiment, however, the present invention makes use of the heat applied to the platens 50, 60 to in turn heat the belts 150, 160. Regardless, the preferred heat-retaining characteristic of the belts 150, 160 results in heat being retained by the belts 150, 160, especially in those segments otherwise directly in contact with the platens 50, 60, respectively, as the belts 150, 160 exit the first station 22.

Extension of the belts 150, 160 from the downstream end 38 of the first station 22 corresponds with the second station 24, as shown in FIG. 1. With this in mind, the second station 24 is defined by an upstream end 170 and a downstream end 172. The upstream end 170 is adjacent the downstream end 38 of the first station 22, such that an article traveling in the machine direction A exits the downstream end 38 of the first station 22 and enters the upstream end 170 of the second station 24. In one embodiment, articles are directly transferred from the first station 22 to the second station 24; alternatively, a longitudinal spacing can exist between the first and second stations 22, 24. Regardless, the second station 24 includes portions of the upper and lower belts 150, 160, and, in one embodiment, an elongated stop member 174. As described in greater detail below, the stop member 174 is associated with the upper belt 150 otherwise provided with the first belt assembly 140, and serves to limit overt displacement of the upper belt 150 relative to the lower belt 160 within the second station 24.

As previously described, the belts 150, 160 are continuously moved along a defined path during operation of the system 20. At any point in time, then, the upper belt 150 can be described as including a segment 180 extending from the first platen assembly 40, and the lower belt 160 as including a segment 182 extending from the second platen assembly 42. By way of explanation, the so-defined segments 180, 182 will, with continued movement of the platen bands 76, 116 (relative to the machine direction A and the orientation of FIG. 1, the platen band 76 moves counter clockwise, and the platen band 116 moves clockwise) move downstream from the second station 24, around or beyond the corresponding platen assemblies 40, 42 (via the pulleys 152, 162), pass through the first station 22, etc. Thus, the belts 150, 160 will always include the segment 180, 182 along the second station 24, but the physical portion of the belt 150, 160 comprising the segment 180, 182 will continuously change with movement of the belts 150, 160.

With the above conventions in mind, the belts 150, 160 are under tension and contacted by the respective stationary guides 154a, 164a such that the segments 180, 182 extend in a substantially linear fashion along the second section 24. To this end, a spacing between the segments 180, 182 approximates the spacing provided by the holding region 46 of the first station 24. Unlike the first station 22, however, a spacing between the segments 180, 182 is not rigidly established in the second station 24. That is to say, the platen assemblies 40, 42 are adapted to force or compress articles being passed there between to a desired thickness, with the holding region 46 overtly resisting any natural tendency of the article to expand from this compressed thickness. In contrast, any compressive force and/or resistance to article expansion associated with the second station 24 is at most nominal. For example, the stop member 174 is loosely mounted to the frame 28 and interfaces with the upper belt 150 along at least a portion of a length of the second station 24. In one embodiment, the stop member 174 floats on top of the upper belt 150, and is comprised of a compliant material such as soft foam (e.g., silicon foam). With this one construction, the stop member 174 slightly resists upward (relative to the orientation of FIG. 1) movement of the upper belt 150 relative to the lower belt 160, serving to maintain contact between the upper belt 150 and an article being processed within the second station 24. As such, while tensioning of the belts 150, 160 in combination with the stop member 174 may place a slight compressive force on to an article carried between the belts 150, 160 in the second station 24 (and/or resist an expansion in thickness of the article), this compressive or resistive force is at least 10 times, more preferably 50 times, even more preferably at least 100 times less than the compressive or resistive force associated with the first and second platen assemblies 40, 42 along the holding region 46 of the first station 22. To this end, the second station 24 is preferably configured such that the upper belt 150 will lift away from the lower belt 160 with expansion of an article carried therebetween, thus facilitating a natural "rise" of the article during baking.

In addition to placing a small weight on to the upper belt 150, the stop member 174 can, in one embodiment, insulate the upper belt 150 from losing heat from a surface opposite the lower belt 160 along the second station 24. In particular, by selecting an appropriate material for the stop member 174, such as foam material having a low thermal conductivity (on the order of 0.065 btu/(hr×ft×deg F) in one embodiment), conduction of heat from the upper belt 150 will occur primarily along the outer surface thereof (i.e., the surface of the upper belt 150 that otherwise faces the lower belt 160). As described in greater detail below, the upper belt 150 (as well as the lower belt 160) desirably conducts or convects heat on to an article passing between the belts 150, 160; by providing the stop member 174 with insulative properties, this desired heat transfer will occur more efficiently. In one alternative embodiment, an insulative member (not shown) is positioned to contact the lower belt 160 in a similar manner.

During use, the first station 22 serves as a compression and heating station, subjecting articles passing therein to a compression force and heat, whereas the second station 24 serves as a dwell and heating station in which the pressed articles are subjected to heat or baked with little or no compression or expansion resistant force being present or applied. With the one embodiment of FIG. 1, the belts 150, 160 serve to carry articles through and between the stations 22, 24, and thus define a travel or line speed of the system 20. In other words, because the belts 150, 160 are preferably continuous, a line speed of the first station 22 is identical to a line speed of the second station 24. With this in mind, a machine or travel length of the first station 22 is, in one embodiment, less than a machine or travel length of the second station 24. With this one embodiment, then, an article being processed by the system 20 will reside within the first station 22 for a time period that is less than a time period associated with the second station 24 (assuming that the belts 150, 160 are moved at a constant speed). For example, in one embodiment, machine lengths of the first and second stations 22, 24 are such that a processing time associated with the second station 24 is at least 150% that of the first station 22, preferably at least 200%, more preferably at least 350%, even more preferably at least 600%. Alternatively, other travel lengths/times can also be employed. With the one embodiment illustrated in FIG. 1, the upper and lower belts 150, 160 have approximately identical lengths along the second station 24. Alternatively, however, the lower belt 160 can be longer (in the machine direction A) than the upper belt 150; more particularly, the segment 182 of the lower belt 160 can define a machine length that is longer than a machine length of the segment 180 of the upper belt 150. Even further, the second station 24 can be configured such that the upper belt 150 lifts away from the lower belt 160 (and thus an article carried thereon), at or adjacent the downstream end.

The system 20 can be used to process a wide variety of food products. In one embodiment, the system 20 is used to process a farinaceous dough or a dough intermediate into a pressed, at least partially baked or fully baked, food product, for example a tortilla, especially a wheat-based food product although the apparatus and method can also be used to process flat farinaceous products (i.e., flour-based) such as corn tortillas. In other variations, the system and method can be used to prepare other popular styles of flat baked farinaceous products including, for example, pita or pocket bread, tostadas, chicharrones, chorizos, gordidas, chalupas, etc. Other flat baked products can be prepared in accordance with the present invention from doughs prepared from blends of flour (e.g., a blend of wheat and corn flour such as a wheat flour based dough that includes flavor and color levels (e.g., 1% to 10% of the dough) of corn flour).

In addition to the flour ingredient, exemplary dough processed by the system and method of the present invention can additionally include such common dough ingredients as about 0% to 15%, preferably about 5% to 12%, oil or fat. For those embodiments intended to be distributed at room temperature (i.e., shelf stable), the dough can include about 1% to 15% of a humectant such as glycerin, preferably about 2% to 8%. The dough can additionally include up to 2% of dough conditioners such as whey, L-cysteine, sodium steryl lactylate, sodium or calcium sulfate, fumaric acid, sodium metabisulfate, or mixtures thereof. In certain variations, the dough conditioners can be dough strengtheners. In more preferred embodiments, the dough conditioners can be dough strength weakeners, especially L-cysteine. In preferred form, the dough is extensible and uses conditioners that weakens the dough wherein the cohesive, extensible, rubbery mass that is formed by mixing water and wheat flour will usually be highly extensible when subjected to stress, but will exhibit a reduced tendency to return to its original dimensions when the stress is removed.

The dough can additionally comprise flavor levels of sugars, salts, and flavors, especially tomato paste or powder, herb (e.g., cilantro), and dried cheese flavors or other flavor and color ingredients (e.g., dried ground green or red pepper). The dough can include about 0.1% to 2%, preferably about 0.5% to 2%, of a chemical leavening system including at least one heat activated baking acid and a baking powder (e.g., sodium bicarbonate). The dough can also include preservatives such as sorbic acid, potassium sorbate, and/or sodium propionate at permitted levels. Further, emulsifiers (e.g., mon and di glycerides) can also be included to facilitate rapid mixing. The dough can further be prepared with a sufficient amount of moisture such that the dough as a moisture content ranging from about 10% to 50%, preferably about 25% to 38%. In addition, the dough has, in one embodiment, a protein content of at least 10%.

Figure 6:
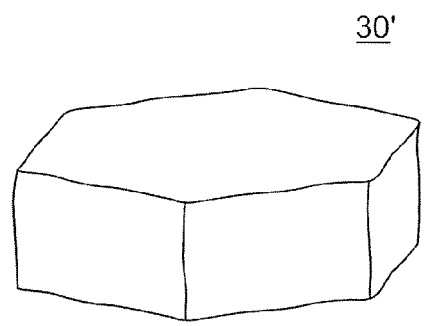
FIG. 6 is a top view of a dough intermediate puck in accordance with the present invention.
Figure 7:
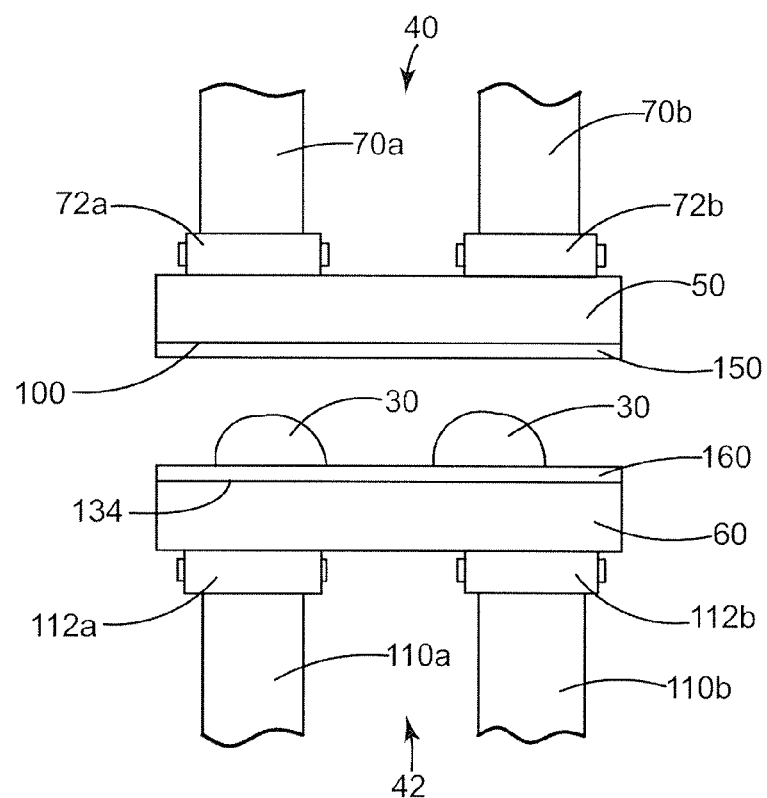
Figure 10:
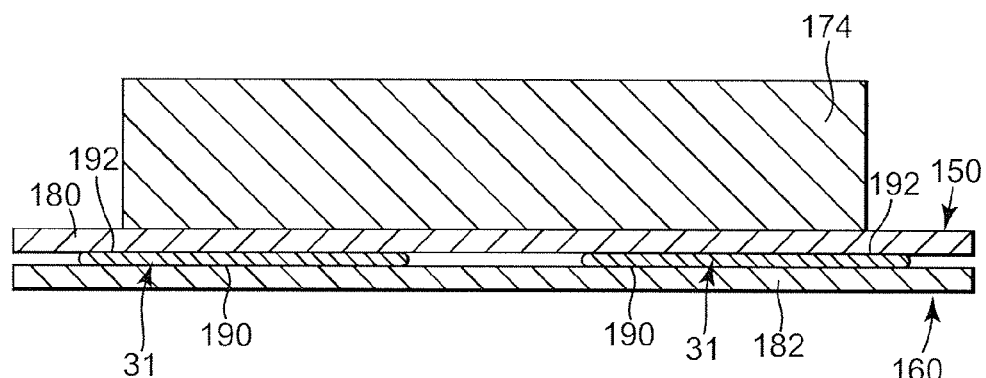
FIG. 10 is a partial, cross-sectional view showing processing of a pressed puck within the second processing station of FIG. 1.

With reference to the schematic illustration of FIG. 1, one or more of the dough intermediates 30 are formed as pucks. In this regard, the term "puck" is used generically, and is not limited to any particular size, shape or volume. For example, the dough intermediate pucks 30 can be formed by first mixing desired ingredients and then shaping pucks therefrom of desired size(s) and shape(s) such as by divide and round; extrusion; sheeting/cutting; etc. With respect to the dough intermediate pucks 30 illustrated in FIG. 1, the dough intermediate pucks 30 approximate spheres or balls. In preferred embodiments, the spheres can weight about 25 g to 50 g each. Alternatively, and as shown in the one more preferred embodiment of FIG. 6, the dough intermediate pucks 30' are sheet cut to approximate a hexagonal cylinder or other tessellated shape. In less preferred embodiments, the dough intermediate pucks can be cubes or rectangles. It has been surprisingly been found that for certain dough formulations, a hexagonal dough intermediate puck will more readily result in a circular-shaped end product (such as a tortilla) when processed by the system and method of the present invention. Alternatively, a wide variety of different shapes can be employed.

Regardless, and returning to FIG. 1, the dough intermediate pucks 30 (or other quantity of farinaceous dough) are placed on to the lower belt 160 upstream of the upstream end 36 of the first station 22. The first and second platen assemblies 40, 42 and/or the first and second belt assemblies 140, 142 are then operated to move the upper and lower belts 150, 160 as previously described to move the dough intermediate pucks 30 into the first station 22. In particular, and as shown in FIG. 5, the dough intermediate pucks 30 are directed into the converging region 44 of the first station 22. As previously described, the upper belt 150 contacts the platen band 76 that in turn is rigidly connected to the drive chains 72*a* (one of which is shown in FIG. 4). The drive chains 72*a* ride along the guide surface 80 of a corresponding one of the guides 70 (one of which is shown in FIG. 5) such that the upper belt 150 converges toward the lower belt 160. Similarly, the lower belt 160 contacts the platen band 116 that in turn is rigidly connected to the drive chains 112 (one of which is shown in FIG. 5). The drive chains 112 ride along the guide surface 120 of a corresponding one of the guides 110 (one of which is shown in FIG. 5) such that a lateral position relative to the upper belt 150 remains constant or converges relative thereto. With this in mind, then, movement of the dough intermediate pucks 30 continues within the converging region 44 until the upper belt 150 contacts the dough intermediate puck (for example, the dough intermediate puck 30a in FIG. 5). With further downstream movement within the converging region 44 (via continued movement of the belts 150, 160), a spacing between the belts 150, 160 continues to decrease, placing a compression force on to the dough intermediate puck 30a, thereby compressing the dough intermediate puck 30a. In other words, the platen assemblies 40, 42 are configured such that for virtually any dough formulation, the platen bands 76, 166, and thus the belts 150, 160, will progress through the path shown in FIG. 5, rigidly maintaining the pre-determined spacing and overcoming any resistance thereto by the dough intermediate pucks 30. Thus, the dough intermediate pucks 30 are gradually compressed or reduced in thickness. In one embodiment, the dough intermediate pucks 30 are subjected to a compression force or pressure on the order of 20 psig to 50 psig for a time period in the range of 0.25 seconds to 10 seconds, preferably 0.25 to 5 seconds, within the converging region 44. FIGS. 7-10 illustrate the gradual compression or reduction in thickness of the dough intermediate puck 30 as it traverses through the converging region 44. As a point of reference, FIGS. 7-10 illustrate the first platen assembly 40 as including two of the guides 70a, 70b, and the second platen assembly 42 as including two of the guides 110a, 110b, and two of the drive chains 112a, 112b.

Returning to FIGS. 1 and 5, the dough intermediate pucks 30 continue moving, via movement of the belts 150, 160, to the holding region 46. In one embodiment, a minimum gap between the belts 150, 160 at the converging region 44, and thus a thickness of the pucks 30 exiting the converging region 44, is on the order of 0.5 mm to 10 mm. As previously described, a spacing between the platen bands 76, 116, and thus a gap distance between the belts 150, 160, is approximately uniform within the holding region 46. Thus, the dough intermediate pucks 30 are compressed to a pre-determined thickness in the converging region 44 and maintained at this thickness (or some other predetermined thickness) along the holding region 46, with the dough intermediate pucks 30 forced to maintain a thickness commensurate with the holding region 46 spacing. In effect, the holding region 46 serves to maintain a predetermined thickness of the pucks 30; unlike the converging region 44, the holding region 46 does not overtly apply a compression force onto the pucks 30, but instead resists expansion. In one embodiment, an effective compression force on the pucks 30 in the holding region 46 dissipates as compared to the converging region 44. For example, in one embodiment, where the pucks 30 are a dough, such as a dough formulated to form tortillas, a ratio of compression upon the pucks 30 in the holding region 46:compression upon the pucks 30 in the converging region 44 is not more than 1:3, preferably not more than 1:5, even more preferably not more than 1:6, with a processing time associated with the holding region 46 in the range of 0.1 second to 10 seconds, more preferably 0.3 second to 3 seconds. In another embodiment, a compression force upon the pucks 30 in the holding region 46 is on the order of 5 psig.

As previously described, the heating elements 52, 62 operate to heat the platen bands 76, 116. As such, individual ones of the platens 50, 60 are, prior to entering the converging and holding regions 44, 46, heated to a desired temperature (on the order of about 175° C. to 232° C. (347° F. to 450° F.), preferably about 200° C. (392° F.)). Heat from the platens 50, 60 is transferred to the corresponding belt 150, 160 (principally by conduction, and by convection or both), that in turn conduct heat on to surfaces of the dough intermediate pucks 30 traversing through the holding region 46. It has been found that with heating, the dough intermediate pucks 30 will more readily compress to the desired thickness, and are less susceptible to undesirable snap-back following processing within the holding region 46. In fact, it has surprisingly been found that applying heat to chemically leavened dough intermediate pucks 30 along the holding region 46 (along with subsequent heating or baking described below) eliminates the need for proofing the dough intermediate pucks 30 prior to processing by the system 20 of the present invention.

With specific reference to FIG. 1, following processing by the first station 22, the dough intermediate pucks 30 are characterized as being pressed and heated pucks 31. The pressed pucks 31 may be further characterized as being partially-baked due to heating within the first station 22; however, the pressed pucks 31 are not fully baked. Regardless, the pressed pucks 31 are heated, or further heated, within the second station 24 as follows. In particular, with additional reference to FIG. 10 that otherwise depicts a transverse cross-sectional view of two of the pressed pucks 31 within the second station 24, the segment 182 of the lower belt 160 is in direct contact with a bottom surface 190 of the pressed pucks 31, whereas the segment 180 of the upper belt 150 is in direct contact with a top surface 192 of the pressed pucks 31. The large forces placed upon the processed pucks 31 by operation of the first station 22 renders bottom and top surfaces 190, 192 to have enlarged, flat surface areas, resulting in enhanced surface area contact between the pressed pucks 31 and the belts 150, 160. As previously described, the segments 180, 182 have previously been heated within the first station 22. Residual heat retained by the segments 180, 182 is thus transferred to the pressed pucks 31 as the pressed pucks 31 move through the second station 24. A supplemental heating source(s) can also be provided within the second station 24. Stated otherwise, the pressed pucks 31 entering the upstream end of the 170 of the second station 24 are characterized as having an initial internal temperature. The initial internal temperature can be the same as an internal temperature of the dough intermediate pucks 30 prior to processing by the first station 22, or can be higher than the dough intermediate pucks 30 due to heat applied within the first station 22. Regardless, the pressed pucks 31 are continually exposed to an elevated temperature along the second station 24 via direct contact with the belts 150, 160, thereby raising or at least maintaining an internal temperature thereof. The pressed food products 32 exiting the downstream end 172 of the second station 24 thus have an internal temperature that is greater than the initial internal temperature. The stop member 174 ensures that the upper belt 150 remains in contact with the pressed pucks 31 throughout an entirety of the second station 24, and serves to limit overt snap-back or expansion in thickness thereof, although minor expansion will desirably occur during leavening with certain product formulations. That is to say, a spacing between the belts 150, 160 can increase along the second station 24, either by directing the belts 150, 160 through a desired path or by allowing the upper belt 150 to lift away from the lower belt 160 as the pressed pucks 31 naturally expand/rise with baking.

In effect, operation of the system 20 is such that the belts 150, 160 define upper and lower surfaces, respectively, of a confinement zone in which a baked farinaceous food product is made. Relative to this confinement zone, a quantity of farinaceous dough is initially compressed (e.g., along the converging region 44) for a first time to form a flattened dough piece. Subsequently, the flattened dough piece is maintained in the flattened state and heated (e.g., along the holding region 46) for a second time to form a flattened heated dough piece. Finally, the flattened heated dough piece is baked for a third time while remaining in the confinement zone (e.g., the second station 24). By way of example, the certain farinaceous dough formulations, the flattened dough piece is heated to an internal temperature of 85° C. (185° F.) to form the flattened heated dough piece; this internal temperature is maintained at least 90° C. (194° F.) during baking.

With one preferred embodiment where the system 20 is used to process dough intermediates into tortillas, the dough intermediate ingredient formulation includes starch. In this regard, as the pressed pucks 31 are heated within the second station 24, the starch gelatinizes, resulting in a fully leavened food product 32. It has been surprisingly found that when the pressed pucks 31 are "baked" in the full contact environment provided by one embodiment of the second station 24, water within the dough formulation will essentially remain at the surface of the pressed pucks 31 (i.e., will not readily evaporate or otherwise burn off), resulting in the pressed food products 32 not having a crust-like appearance otherwise associated with bread or dough-type products subjected to conventional baking processes. In one embodiment, the starch content is gelatinized such that less than 10% of a surface area of at least one of the bottom and top surfaces 190, 192 is un-gelatinized and translucent.

With specific reference to FIG. 1, following processing by the second station 24, the pressed food products 32 are at least partially baked, more preferably fully baked, and are then removed from the carrier 26 for further processing. For example, the pressed food products 32 can be moved to a separate area for cooling and subsequent packaging. For certain resultant or finished products, such as tortillas, the finished product 32 can have a water activity value $A_w$ ranging from about 0.8 to 0.95. In certain preferred forms, the finished product 32 (e.g., a tortilla) is suitable for packaging and distribution for sale under shelf stable conditions for up to six months at room temperatures. In shelf stable form, the finished product 32 can have a water activity value $A_w$ ranging from about 0.80 to 0.90, preferably about 0.83 to 0.99, and a moisture ranging from about 23% to 39%. In other variations, the finished product 32 (e.g., a tortilla) is prepared for fresh distribution (i.e., for a shelf life up to 60 days) and can have a water activity value $A_w$ from about 0.9 to about 0.95. Regardless of the water activity value, the finished product is, in one embodiment, preferably leavened and has a density of about 0.6 g/cc to 0.8 g/cc. In preferred form, the leavened finished product 32 (e.g., a tortilla) has a total sodium salts of leavening acids of less than 100 ppm, a degree of gelatinization of at least 90% as determined by differential scanning calorimetry, opposing major surfaces exhibiting less than about 5% translucent area. Where the finished product 32 is a tortilla, in preferred form, the resultant tortilla 32 has a mass of about 25 g to 50 g and a thickness of about 1.5 mm to 3.8 mm.

Regardless of exact form, in one embodiment, the finished product 32 is, following processing by the second station 24 (or other processing described below such as toasting), cooled and packaged. For example, the finished product 32 is cooled to a temperature of less than 30° C. (86° F.). Various packaging techniques can be employed. In one embodiment, the finished product 32 is disposed within a sealed food package fabricated from flexibly packaging film; in another embodiment, two or more of the finished products 32 are stacked within the packaging. To this end, the finished product(s) 32 can be packaged in a low oxygen packaging atmosphere. Alternatively, other packaging techniques can be employed. Once packaged, the resultant packaged food article can then be distributed at room temperature or in cooled environments.

In one embodiment, the system 20 further includes a toasting station 200 downstream of the second, dwell station 24. The toasting station 200 can assume a variety of forms, and in one preferred embodiment is configured to impart a desired toasted pattern to one or both of the opposing surfaces of the pressed food product 32. For example, toast points can be applied to at least 5% of a surface area of one or both of the opposing surfaces of the pressed food product 32. Because the pressed food product 32 is preferably fully baked following the second station 24, the toasting station 200 can provide any desired toasting pattern as no concern need be given for achieving complete baking of the pressed food product 200. In one embodiment, the second station 24 can be adapted to perform a toasting operation, such as by residual heat of the belts 150, 160 and/or via a supplemental heating source (not shown) positioned adjacent the downstream end 172 of the second station 24.

The system and method of the present invention provides a marked improvement over previous designs. In particular, the present invention processes dough intermediates into pressed, baked (or at least partially-baked) food products on a continuous basis, and can eliminate the need for proofing. In one embodiment, the dough intermediates are heated and generally compressed to a consistent, desired thickness and then baked in an essentially non-compression environment while moving in a continuous fashion. To this end, heat generated during the gradual compression operation is used to directly effectuate subsequent baking.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of making a baked farinaceous flat food product, the method comprising:
   a) providing a dough intermediate puck;
   b) processing the dough intermediate puck within a first station, wherein step b) includes:
      continuously contacting opposing surfaces of and applying a compression force to the dough intermediate puck in a manner preventing the dough intermediate puck from naturally rising,
      applying heat to the dough intermediate puck,
      wherein step b) results in a pressed puck;
   c) processing the pressed puck within a second station, wherein step c) includes:
      continuously contacting opposing major surfaces of the pressed puck in a manner allowing the pressed puck to naturally rise from an upstream end of the station second,
      applying heat to the pressed puck,
      wherein step c) results in a pressed, at least partially-baked food product;
   d) wherein steps b) and c) are characterized by continuous movement of the puck such that the puck continuously moves from an upstream end of the first station to a downstream end of the second station; and e) removing the food product from the second station.

2. The method of claim 1, further comprising:
operating a processing apparatus including a first continuous belt extending along an entirety of and between the first and second stations; and
continuously moving the first belt to generate a continuous path of travel as part of steps b) and c).

3. The method of claim 2, wherein the processing apparatus further includes a second continuous belt opposite the first belt, the method further comprising:
placing the dough intermediate puck on the first belt prior to step b);
wherein the second belt contacts the dough intermediate puck as part of step b).

4. The method of claim 3, further comprising:
maintaining contact between the second belt and the pressed puck following step b).

5. The method of claim 4, wherein the first belt and the second belt remain in contact with the pressed puck as part of step c).

6. The method of claim 3, wherein step b) includes heating the first and second belts such that the first and second belts maintain a residual heat upon exiting the first station and wherein step c) includes conducting the residual heat from the first and second belts to the pressed puck.

7. The method of claim 1, wherein step b) is characterized by simultaneously applying a compressive force and heat to the dough intermediate puck.

8. The method of claim 1, wherein applying a compressive force to the dough intermediate puck as part of step b) includes:
gradually applying a compressive force to the dough intermediate puck for a first time period to force the dough intermediate puck to a reduced thickness; and
rigidly resisting expansion of the dough intermediate puck from the reduced thickness for a second time period.

9. The method of claim 1, wherein a maximum force applied at step c) is less than a maximum force applied at step b).

10. The method of claim 1, wherein prior to step c), the pressed puck has an internal temperature, and further wherein the internal temperature increases during step c).

11. The method of claim 1, wherein the pressed, at least partially-baked food product is characterized as being more fully baked than the pressed puck.

12. The method of claim 11, wherein the pressed food product is fully baked following step c).

13. The method of claim 1, wherein the dough intermediate puck includes a starch ingredient, and further wherein step c) includes causing the starch to gelatinize.

14. The method of claim 1, wherein step a) includes forming the dough intermediate puck as a ball or disc.

15. The method of claim 1, wherein step a) includes forming the dough intermediate puck to have a hexagonal shape.

16. The method of claim 1, wherein the pressed, at least partially-baked food product is a tortilla.

17. A system for forming a baked, pressed food product from a dough intermediate, the apparatus comprising:
a first, compression station defining an upstream end and a downstream end,
the first station including:
a first platen assembly including a first platen and a heating element for heating the first platen,
a second platen assembly including a second platen and a heating element for heating the second platen,
wherein the first and second platen assemblies are positioned opposite one another and combine to define a converging region extending from the upstream end and a holding region extending between the converging region and a downstream end, and further wherein a convergent spacing is established between the first and second platens along the converging region and a relatively uniform, minimum spacing is established between the first and second platens along the holding region; and a second, dwell and heating station defining an upstream end and a downstream end, the upstream end of the second station positioned adjacent the downstream end of the first station, the second station including:
a first belt including a belt segment extending from the downstream end of the first station, the first belt being associated with the first platen assembly such that the first belt contacts the first platen along the holding region,
a second belt including a belt segment extending from the downstream end of the first station, the second belt being associated with the second platen assembly such that the second belt contacts the second platen along the holding region,
wherein the first platen establishes a level of resistance to lifting movement of the first belt away from the second belt,
an elongated stop member apart from the platen assemblies and contacting a surface of the first belt opposite the second belt, wherein the stop member resists lifting movement of the first belt away from the second belt at a level at least 10 times less than the level of resistance established by the first platen,
wherein the first and second belts are positioned opposite one another and combine to define a dwell and heating region, a spacing between the belt segments in the dwell region at least initially approximating a spacing of the holding region;
wherein the system is adapted to continuously move an intermediate of dough from the upstream end of the first station to the downstream end of the second station to process a dough intermediate to a pressed, at least partially-baked food product.

18. The system of claim 17, wherein the first and second belts are continuous belts.

19. The system of claim 17, wherein the elongated stop member is a compliant material.

20. The system of claim 17, wherein the elongated stop member is foam.

21. A method of making a baked farinaceous flat food product, the method comprising:
a) providing a quantity of farinaceous dough having an initial moisture content and temperature;
b) pressing the dough for a first time between upper and lower surfaces of a confinement zone with sufficient compression force to form a flattened dough piece having opposed major surfaces;
c) maintaining the flattened dough piece in the confinement zone and heating the flattened dough piece for a second time to heat the flattened dough piece to an internal temperature of at least 80° C. (176° F.) to form a flattened heated dough piece; and
d) baking the flattened heated dough piece in the confinement zone while at least maintaining the internal temperature above 90° C. (194° F.) for a third baking time to provide an at least partially baked food product;

wherein step c) includes maintaining the upper and lower surfaces at a predetermined gap distance and step d) includes the flattened heated dough piece expanding to lift the upper surface away from the lower surface to change a gap distance between the upper and lower surfaces to a distance greater than the predetermined gap distance.

22. The method of claim 21, wherein steps c) and d) are characterized by the upper and lower surfaces of the confinement zone remaining in contact with respective ones of the opposed major surfaces of the dough piece.

23. The method of claim 21, wherein step c) is characterized by maintaining a constant gap distance between the upper and lower surfaces.

\* \* \* \* \*